United States Patent [19]

Sakano

[11] Patent Number: 5,144,456
[45] Date of Patent: Sep. 1, 1992

[54] IMAGE PROCESSING APPARATUS AND METHOD
[75] Inventor: Yukio Sakano, Fuchu, Japan
[73] Assignee: Ricoh Company, Ltd., Japan
[21] Appl. No.: 460,046
[22] Filed: Jan. 2, 1990

[30] Foreign Application Priority Data

Jan. 21, 1989 [JP] Japan .................. 1-11008
Jan. 21, 1989 [JP] Japan .................. 1-11009
Oct. 12, 1989 [JP] Japan .................. 1-264005

[51] Int. Cl.⁵ .............................................. H04N 1/40
[52] U.S. Cl. ................................. 358/443; 358/448; 358/458
[58] Field of Search ............... 358/443, 447, 448, 455, 358/456, 457, 458, 464, 465, 461

[56] References Cited

U.S. PATENT DOCUMENTS 4,298,895 11/1981 Arai et al. ........................ 358/463
4,760,464 7/1988 Sakano ............................ 358/461
4,851,920 7/1989 Sakano ............................ 358/456
4,984,283 1/1991 Sakano ............................ 382/28

FOREIGN PATENT DOCUMENTS 55-58670 5/1980 Japan .
57-53179 3/1982 Japan .
60-263576 12/1985 Japan .
62-186663 8/1987 Japan .

Primary Examiner—Edward L. Coles, Sr.
Assistant Examiner—Thomas D. Lee
Attorney, Agent, or Firm—Mason, Fenwick & Lawrence

[57] ABSTRACT

An image processing apparatus includes a comparator which determines whether input gradation levels of pixels included in a predetermined matrix are equal to or higher than a reference gradation level. The apparatus further includes a converter which converts the input gradation levels of the pixels equal to or higher than the reference gradation level into a predetermined gradation level less than the reference gradation level and for passing the input gradation levels of the pixels less than the reference gradation level as they are, and an averaging circuit which averages the predetermined gradation level of each of the pixels having the input gradation levels equal to or higher than the reference gradation level and the input gradation levels of the remaining pixels other than the pixels relating to the reference gradation level to thereby output an averaged gradation level of a pixel of concern. Moreover, the apparatus includes an output circuit which derives a background corrected gradation level of the pixel of concern from the predetermined gradation level relating to the pixel of concern and the averaged gradation level.

30 Claims, 7 Drawing Sheets

IMAGE PROCESSING APPARATUS AND METHOD

BACKGROUND OF THE INVENTION

The present invention generally relates to an image processing apparatus and methods, and more particularly, to an improvement in a process of correcting a background image. The present invention is suitably applicable to an image processing apparatus such as a digital copying machine, a facsimile machine or an image reading apparatus.

Recently, a variety of image processing directed to forming a reproduced image on a clear reproduced background image has been proposed. Japanese Laid-Open Patent Application No. 57-53179 discloses an MTF correction procedure using a highpass filter. However, in the proposed MTF correction procedure, a high-frequency noise such as an unevenness in density of background is emphasized. Thus, a reproduced background image is contaminated and a noisy reproduced image may be formed.

Japanese Laid-Open Patent Application No. 55-58670 discloses a procedure for eliminating a noise component in an original image by a gradation correction. However, the proposed procedure is complex. In case where the proposed procedure is realized by hardware, the scale thereof is very large and is thus very expensive. Alternatively if the proposed procedure is realized by software, it takes a long time to execute the procedure, and thus the proposed procedure is not suitable for a device which needs high-speed real time processing, such as a digital copying machine.

Japanese Laid-Open Patent Application No. 60-263576 discloses a process of sharpening or smoothing an image signal to be recorded to thereby correct a reproduced image. However, it is very difficult to eliminate a background contamination from a readout image while suppressing the occurrence of a deformation of the readout image. In addition, the proposed process needs a complex calculation procedure.

SUMMARY OF THE INVENTION

It is a general object of the present invention to provide an improved image processing apparatus in which the aforementioned disadvantages are eliminated.

A more specific object of the present invention is to provide an image processing apparatus capable of eliminating a background contamination from a readout image signal without affecting a signal component of a real image contained in the readout image signal.

The above objects of the present invention are achieved by an image processing apparatus for processing image data read out from a document comprising comparing means for determining whether input gradation levels of pixels included in a predetermined matrix are equal to or higher than a reference gradation level the pixels including a pixel of concern and a predetermined number of peripheral pixels; converting means for converting the input gradation levels of the pixels equal to or higher than the reference gradation level into a predetermined gradation level less than the reference gradation level and for passing the input gradation levels of the pixels less than the reference gradation level as they are; averaging means, coupled to the converting means for averaging the predetermined gradation level of each of the pixels having the input gradation levels equal to or higher than the reference gradation level and the input gradation levels of the remaining pixels other than the pixels relating to the reference gradation level to thereby output an averaged gradation level of the pixel of concern; and output means for deriving a background corrected gradation level of the pixel of concern from the predetermined gradation level relating to the pixel of concern and the averaged gradation level relating thereto.

Another object of the present invention is to provide an image processing method which can eliminate a background contamination from a readout image signal without affecting a signal component of a real image contained therein.

This object of the present invention is achieved by a image processing method for processing image data read out from a document, comprising the steps of determining whether input gradation levels of pixels included in a predetermined matrix are equal to or higher than a reference gradation level, the pixels including a pixel of concern and a predetermined number of peripheral pixels; converting the input gradation levels of the pixels equal to or higher than the reference gradation level into a predetermined gradation level less than the reference gradation level and for passing the input gradation levels of the pixels less than the reference gradation level as they are; averaging the predetermined gradation level of each of the pixels having the input gradation levels equal to or higher than the reference gradation level and the input gradation levels of the remaining pixels other than the pixels relating to the reference gradation level to thereby output an averaged gradation level of the pixel of concern; and deriving a background corrected gradation level of the pixel of concern from the predetermined gradation level relating to the pixel of concern and the averaged gradation level relating thereto.

Other objects, features and advantages of the present invention will become apparent from the following detailed description when read in conjunction with the accompanying drawings.

BRIEF DESCRIPTION OF THE DRAWINGS

FIG. 11 is a diagram of a matrix of pixels.

DESCRIPTION OF THE PREFERRED EMBODIMENTS

A description is given of a preferred embodiment of the present invention.

Figure 1:
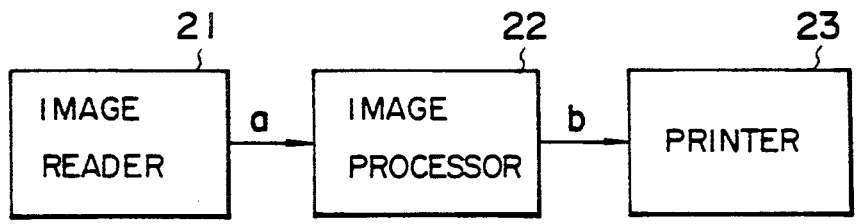
FIG. 1 is a block diagram of an outline of a digital copying machine to which the present invention is applied.

Referring to FIG. 1, there is illustrated an outline of a digital copying machine to which the present invention is applied. The illustrated digital copying machine is made up of an image reader 21, an image processor 22, and a printer 23. The image reader 21 optically reads a document and generates a corresponding analog image signal. Further, the image reader 21 includes an analog-to-digital converter, which converts the analog image signal into a digital image signal. For example, the digital image signal consists of six bits (64 gradation levels). The digital image signal is fed, as an image signal a, to the image processor 22. The image processor 22 executes a background correction procedure in addition to conventional procedures such as a shading correction, MTF (modulation transfer function) correction, smoothing, character mode processing (a binarization procedure based on a fixed slice level), and photograph mode processing (a dither process for example). Then the image processor 22 outputs an image signal b in digital form to the printer 23. The printer 23, which is a laser beam printer for example, records the original image formed by the image signal b on a recording media such as paper.

Figure 2:
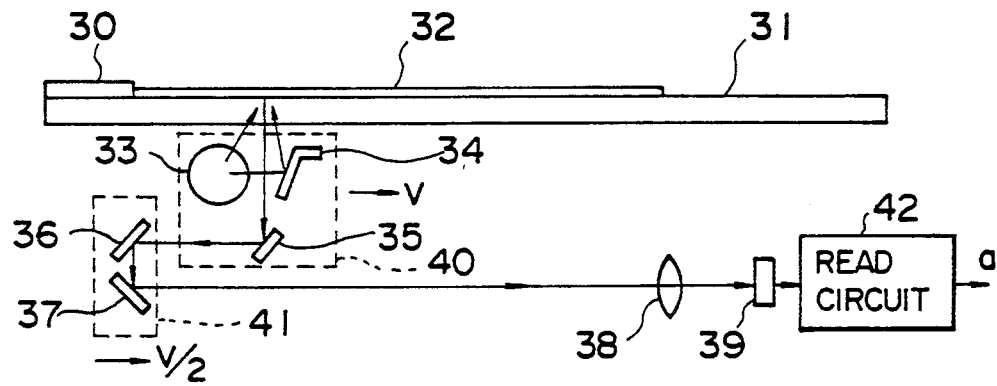
FIG. 2 is a diagram of an optical system employed in the digital copying machine shown in FIG. 1.

FIG. 2 illustrates an optical system of the image reader 21. Referring to FIG. 2, a reference white plate 30 is used for the conventional shading correction. A document 32 to be scanned is placed on a transparent glass plate 31. Light emitted from a fluorescent lamp 33 is projected directly onto the document 32. Some of light from the fluorescent lamp 33 is reflected by a reflection plate 34 and is projected onto the document 32. The reflection plate 34 is used for projecting a large amount of light onto the document 32. A reflected light from the document 32 passes through a first mirror 35, a second mirror 36, a third mirror 37 and a lens 38, and is focused on a CCD (charge-coupled device) line sensor 39. The CCD line sensor 39 handles a main scan of document reading. A first optical unit 40 is made up of the fluorescent lamp 33, the reflection plate 34 and the first mirror 35. The first optical unit 40 moves at a velocity V. A second optical unit 41 is made up of the second mirror 36 and the third mirror 37. The second optical unit 41 moves in the same direction at a velocity 2/V which is half the velocity V of the first optical unit 40 so that a sub-scan is executed. An output signal of the CCD line sensor 39 is amplified by a read circuit 42 (which is a structural element of the image reader 21). The read circuit 42 is provided with a conventional automatic exposure correction function, which determines a corrected level of background based on the real (actually observed) peak value thereof, as will be described later. The read circuit 42 further includes an analog-to-digital circuit, which outputs the aforementioned six-bit digital signal a, which represents 64 gradation levels.

Figure 4:
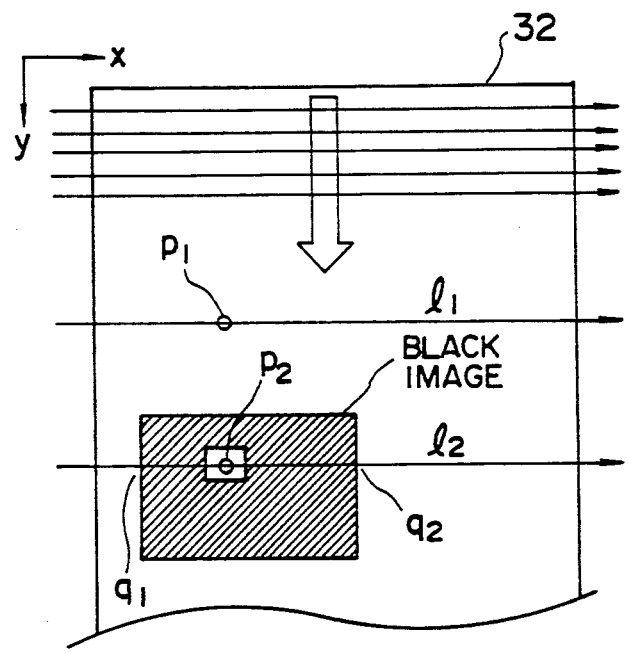
FIG. 4 is a diagram illustrating a main scan and a sub-scan with respect to a document to be scanned.

FIG. 4 illustrates the main scan and the sub-scan. A direction X is the main scanning direction, and a direction Y is the sub-scanning direction. The document 32 is scanned in the sub-scanning direction Y while repeatedly executing the main scan in the direction X. The resolution of reading the document is set equal to 400 dpi (equal to 16 pixels/mm) in the main and sub-scanning directions, for example.

Figure 3:
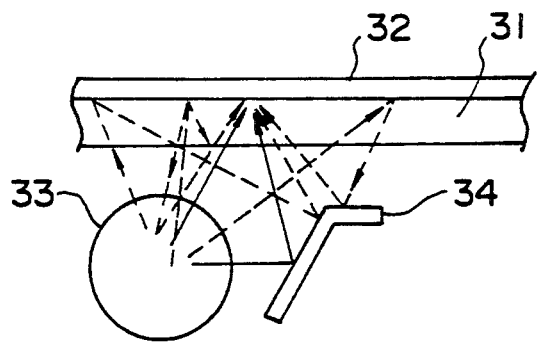
FIG. 3 is a diagram illustrating effective light and flare light.

FIG. 3 illustrates beams around the fluorescent lamp 33 and the reflection plate 34. The illustrated beams pass through two groups of optical paths shown by solid lines and broken lines. Solid lines indicate a group of optical paths through which light beams are projected onto the document 32 directly or after reflected by the reflection plate 34. That is, the solid lines indicate effective optical paths for illumination. On the other hand, broken lines indicate flares. That is, light reflected by the document 32 is reflected by the fluorescent lamp 33 or the reflection plate 34 and is then projected onto a document area around a main scanning line (read position) on the document 32. The presence of flare light affects an amount of illumination on the read position. An amount of a variation in illumination is based on the background of the document 32, and the shape and density of an image around the scanning line. For example, when a document portion on the scanning line is white and a document portion around the scanning line is also white, the digital signal a derived from the read circuit 42 indicates bright white as compared with actual white on the scanning line, due to the presence of flare light. That is, tone (gray scale) formed by the digital signal a is changed toward pure white (gradation level '63'). On the other hand, when the document portion on the scanning line is white and a document portion around the scanning line is black, the digital signal a indicates dark white as compared with actual white on the scanning line, due to the presence of flare light. That is, tone formed by the digital signal a is changed toward gray. The above-mentioned change in tone (gradation level) causes a background contamination.

The influence due to the presence of flare light is described with reference to FIGS. 4 and 5. A position $p_1$ on a main scanning line (read position) $l_1$ is white and an area around the position $p_1$ is also white. A portion $p_2$ on a main scanning line $l_2$ (X address is the same as the portion $p_1$) is white and its close document area is also white. A document area around the close area is all black.

Figure 5:
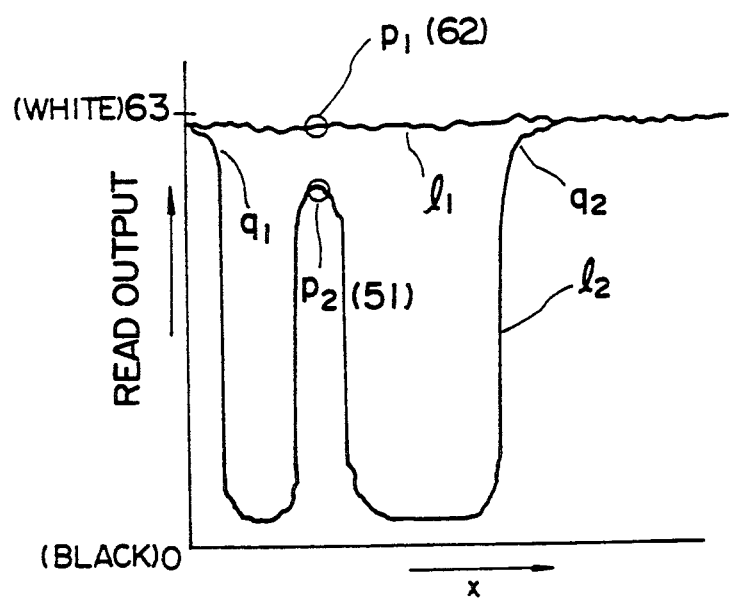
FIG. 5 is a graph illustrating image signals relating to different portions on the document obtained by the main scan.

FIG. 5 illustrates the signals a for the main scanning lines $l_1$ and $l_2$ shown in FIG. 4 obtained after the shading correction. As will be described layer, a white/black logic conversion is performed after the shading correction so that the gradation levels shown in FIG. 5 are converted. Even through white at positions $p_1$ and $p_2$ actually has the same gradation level, the signal a for position $p_1$ indicates gradation level 62 which is one level lower than gradation level 63 (pure white), and on the other hand, the signal a for position $p_2$ indicates gradation level 51. This is because that an amount of illuminance to position $p_2$ decreases due to the presence of the black area on which flare light is reflected. As a result of the presence of flare light, the signal a for position $p_2$ is handled as if a halftone having gradation level 51 is read. The above discussion holds true for positions $q_1$ and $q_2$. It can be seen from FIG. 5 that the signal a exhibits a gradual slope in the vicinity of positions $q_1$ and $q_2$. Thus, document areas in the vicinity of positions $q_1$ and $q_2$ are determined to be a bright halftone (gray). The present invention is directed to overcoming the above-mentioned problems.

Figure 6:
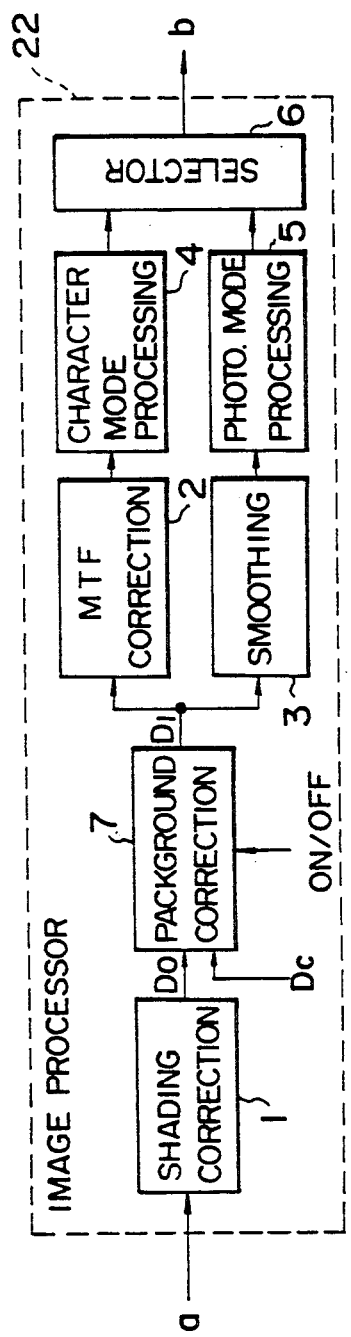
FIG. 6 is a block diagram of an image processor shown in FIG. 1.

A description is given of the image processor 22 shown in FIG. 1 with reference to FIG. 6. The image processor 22 is made up of a shading correction circuit 1, an MTF correction circuit 2, a smoothing circuit 3, a character mode processing circuit 4, a photograph mode processing circuit 5 and a selector 6. Each of these circuits itself is known to a person having an ordinary skill in the art (see Japanese Laid-Open Patent Application No. 62-186663, for example). It is noted that the shading correction circuit 1 executes not only the shading correction but also a conventional white/black logic conversion. In the white/black logic conversion, as shown in FIG. 5, a set of gradation levels where white is gradation level 63 and black is gradation level 0 are converted into a different set of gradation levels where white is gradation level 0 and black is gradation level 63. The signal a is based on the former set of gradation levels. The shading correction circuit 1 outputs an image signal $D_0$ based on the latter set of gradation levels. In the signal $D_O$, the darker image, the higher the gradation level. It is noted that the white/black conversion is not a procedure for obtaining an inverted image but an inversion of gradation levels.

According to the present invention, the image processor 22 includes a background correction circuit 7 interposed between the shading correction circuit 1 and the connection node of the MTF correction circuit 2 and the smoothing circuit 3. The background correction circuit 7 receives the image signal $D_0$ and outputs a background corrected image signal $D_1$. The background correction circuit 7 is configured based on the following algorithm:

$$D_1 = D_0 - \overline{D_0'} \qquad (1)$$

where $\overline{D_0'}$; the average of $D_0'$, $D_0'$; gradation data obtained by converting a gradation level ($D_0$) each of a predetermined number of pixels ($5 \times 5 = 25$ for example) containing a pixel which is being subjected to background correction by using the following formula:

$$D_0' = \begin{cases} D_0; & 0 \leq D_0 < N1 \\ M; & D_0 \geq N1. \end{cases} \qquad (2)$$

The predetermined number of pixels is arranged in a matrix. The number N1 indicating a reference gradation level is set equal to 16, for example, when the image signal $D_0$ indicates 64 gradation levels (0–63) in which pure white has gradation level 0.

The condition (2) means that when the gradation level $D_0$ of each of the pixels contained in the matrix formed by the predetermined number of pixels is less than N1, this gradation level $D_0$ is maintained as it is, and that when the gradation level $D_0$ is equal to or greater than N1, the gradation level $D_0$ is set equal to M which is less than $D_O$ and indicates pure white (zero) or its close level.

Figure 7:
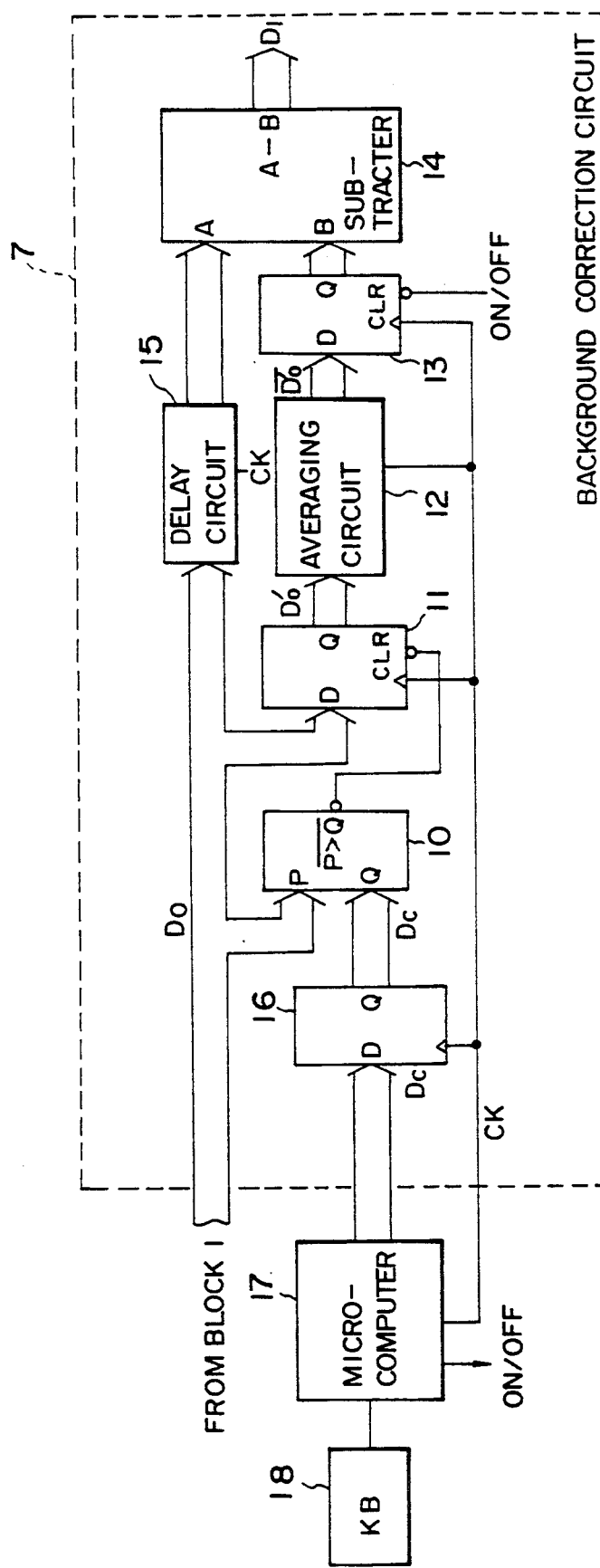
FIG. 7 is a block diagram of a background correction circuit shown in FIG. 6.

FIG. 7 is a block diagram of the background correction circuit 7, which is provided, from a microcomputer 17, with a reference signal Dc which indicates the reference gradation level N1 (equal to 16 for example). The microcomputer 17 controls the entire digital copying machine. A latch 16 formed by a D-type flip-flop latches and outputs the reference signal Dc in synchronism with a clock signal CK supplied from the microcomputer 17. The reference signal Dc output from the latch 16 is supplied to a Q-terminal of a comparator 10, which has a P-terminal supplied with the image signal $D_0$. The comparator 10 compares the image signal $D_0$ with the reference signal Dc and determines whether $D_0 \geq Dc$ (=N1). The comparator 10 outputs a low-level control signal when the image signal $D_0$ is equal to or higher than the reference signal Dc, and alternatively outputs a high-level control signal when the image signal $D_0$ is less than the reference signal Dc.

The image signal $D_0$ is supplied to a latch 11 formed by a D-type flip flop, to which the control signal derived from the comparator 10 is supplied. When $D_0 \geq Dc$ (=N1), the latched image data $D_0$ is cleared (set to zero). On the other hand, when $D_0 < Dc$, the latched image data D0 is maintained as it is, and is supplied, as the gradation level $D_0'$, to the latch 11. The output signal of the latch 11 is supplied, as the gradation level $D_0'$, to an averaging circuit 12.

The averaging circuit 12 accumulates the gradation levels $D_0'$ of pixels contained in an $(m \times n)$ matrix, and calculates the average $\overline{D_0'}$ of the gradation levels $D_0'$. The average $\overline{D_0'}$ is supplied to a latch 13 formed by a D-type flip-flop, which is controlled by an ON/OFF signal supplied from the microcomputer 17. When the ON/OFF signal is at a high level, the latch 13 is made active. Alternatively, when the ON/OFF signal is at a low level, the latch 13 is made inactive. The latch 13 may be omitted from the configuration of the background correction circuit 7. The output signal of the latch 13 is supplied to a B-terminal of a subtractor 14. The image signal $D_0$ from the shading correction circuit 1 passes through a delay circuit 15 and is then supplied to an A-terminal of the subtracter 14. The delay circuit 15 delays the image signal $D_0$ by a delay of time which corresponds to a delay of time caused by the presence of the latches 10, 11, 13 and 16 and the averaging circuit 12. The subtracter 14 calculates $A - B$ ($= D_0 - \overline{D_0'}$), and generates a resultant output $D_1$ ($= A - B$). As a result of the employment of the delay circuit 15, the subtractor 14 is supplied with data $D_0$ and $\overline{D_0'}$ for the same pixel at the same time. The image signal $D_1$ is supplied to the MTF correction circuit 2 and the smoothing circuit 3 shown in FIG. 6.

Figure 8:
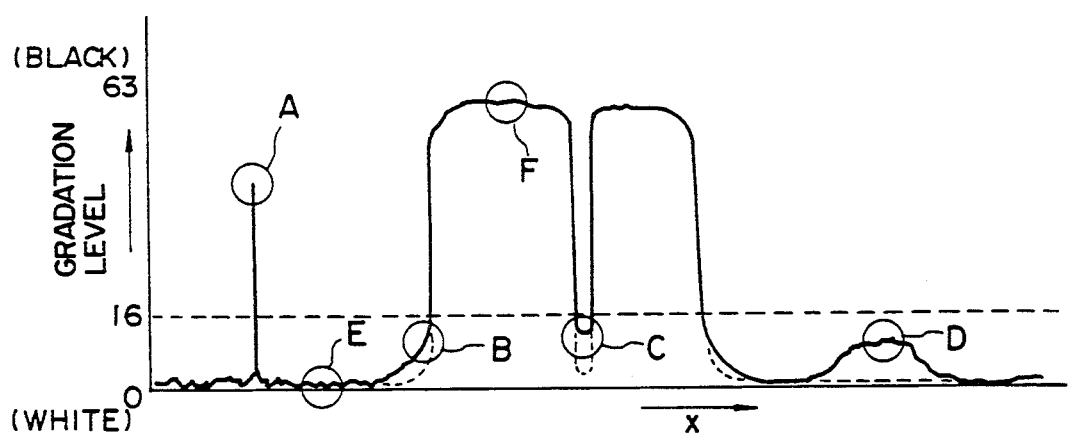
FIG. 8 is a graph illustrating an image signal on a main scanning line and advantages presented by the present invention.
Figure 9:
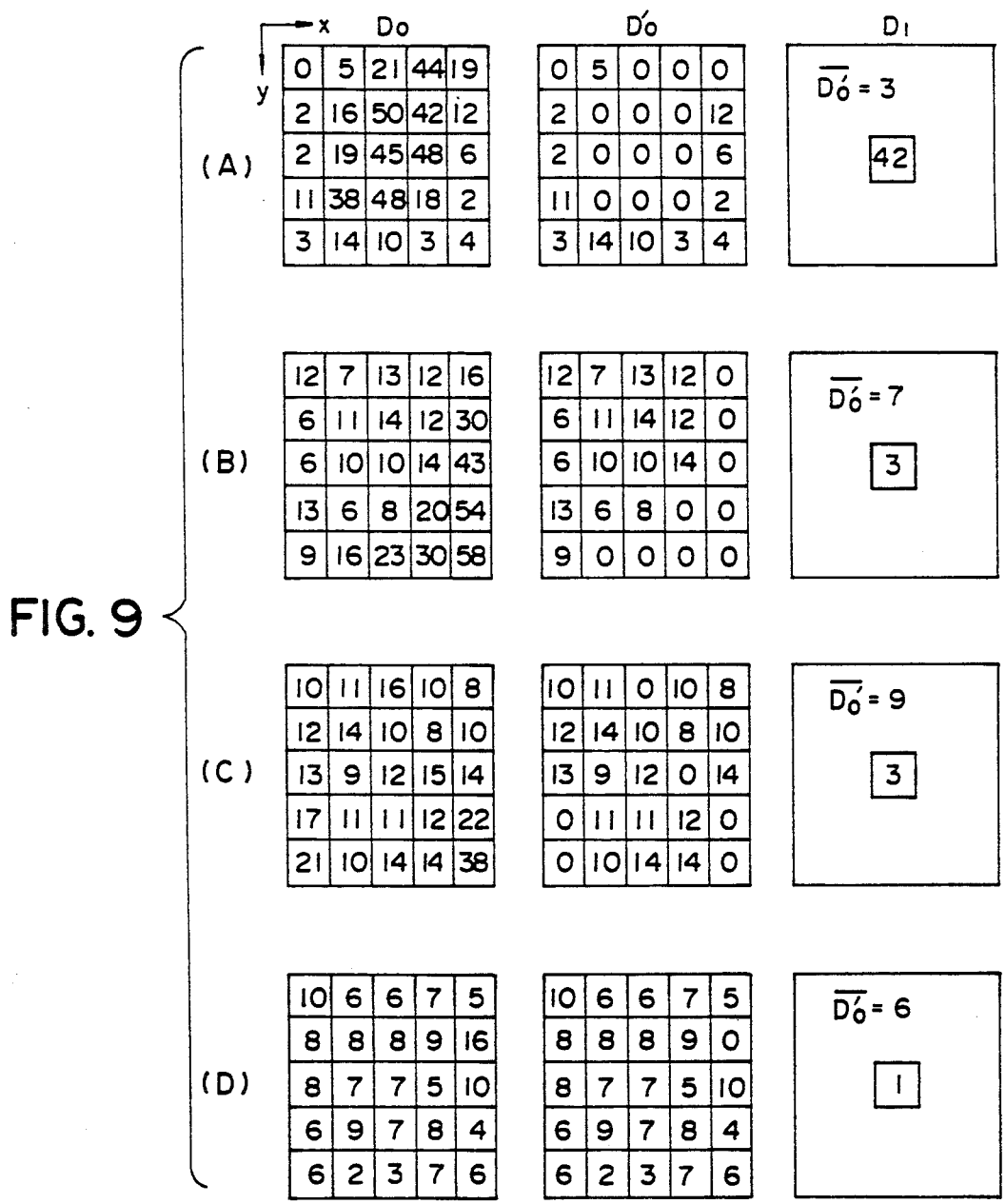
FIG. 9 is a diagram illustrating how to convert a gradation level of each pixel contained in a matrix into a predetermined gradation level and thus correct a background image according to the present invention.

A description is given of advantages presented by the presence of the background correction circuit 7 with reference to FIGS. 8 and 9. The following description relates to a case where $(m \times n) = 5 \times 5$, N1 ($= Dc$) = 16, and a set of gradation levels is in the range between 0 and 63.

FIG. 8 shows a part of an image signal relating to a main scanning line on the document. A solid line corresponds to the image signal $D_0$, and a dotted line corresponds to the background corrected image signal $D_1$ for the same scanning line. A round "A" relates to a thin line image, a round "B" relates to a background portion close to a black area, a round "C" relates to a background portion surrounded by a black area, a round "D" relates to a background portion which is slightly contaminated, a round "E" relates to a background portion (white), and a round "F" relates to a black image. It is noted that FIG. 8 relates to an image on one main scanning line. In actuality, an actual image extends in the sub-scanning direction.

FIG. 9 illustrates pixel data (gradation levels) contained in a $5 \times 5$ matrix, and (A), (B), (C) and (D) of FIG. 9 correspond to "A", "B", "C" and "D" shown in FIG. 8. $D_0$ is image data before the present background correction is executed, $D_0'$ is image data after the background correction is executed, $\overline{D_0'}$ is the average of the image data $D_0'$ and $D_1$ is image data obtained by subtracting $D_0'$ from $\overline{D_0}$. In (A) of FIG. 9, gradation level 45 of the pixel of concern positioned at the center of the matrix (pixel being subjected to the background correction) is converted into gradation level 42. In (B) of FIG. 9, gradation level 10 of the pixel of concern is converted into gradation level 3. In (C) of FIG. 9, gradation level 12 is converted into gradation level 3. In (D) of FIG. 9, gradation level 7 is converted into gradation level 1. It can be seen from the above-mentioned conversion that less level change occurs for the black image at "A" shown in FIG. 8, and on the other hands, the influence because of the presence of flares (B, C) and the background contamination (D) are eliminated so that the image signal can effectively be corrected.

The corrected signal portions are illustrated by dotted lines shown in FIG. 8. As in the case of the black image at "A", black images at "E" and "F" are less changed, that is, $D_1 \approx D_0$.

It is noted that when $D_0 - \overline{D_0'} < 0$, the subtracter 14 sets $D_1$ equal to 0 in place of the actual result $D_0 - \overline{D_0'} (= D_1)$ This is because that the printer 23 cannot print gradation levels less than zero and there occurs no problem in replacing negative gradation levels with zero.

It is preferable that the reference gradation level N1 be determined on the basis of design of the illuminance system including the fluorescent lamp 33 and the reflection plate 34. In the aforementioned example, it is possible to set N1 equal to 15 or 17 in place of 16. It is important that the reference gradation level N1 is higher than that of flare light and lower than that of an image to be printed.

The value M is not limited to zero. Alternatively, it is possible to set M to the minimum gradation level of the background area or set M to the minimum gradation level in the matrix.

The (m×n) matrix is not limited to the 5×5 matrix. Generally, a flare light extends in an area of 1 mm ×1 mm. When one pixel is of a size equal to 1/16 mm, it is preferable to employ a matrix consisting of 16×16 pixels. The averaging circuit 12 may execute a weighted average in place of the aforementioned arithmetical average. In a weighted average, a relatively large weighting factor is given the gradation level of a pixel close to the pixel of concern, and a relatively small weighting factor is given the gradation level of a pixel far from the pixel of concern. The weighted average is effective to a relatively large size of matrix (a 16×16 matrix for example).

A conventional digital copying machine includes a key for adjusting the image density to select one of the desired image density values. The reference gradation level N1 may be set on the basis of the selected image density. A keyboard 18 has a key for setting a desired image density which changes stepwise. The microcomputer 17 has the following table:

TABLE

| Image density | 1 | 2 | 3 | 4 | 5 | 6 | 7 |
|---|---|---|---|---|---|---|---|
| level N1 | 8 | 12 | 16 | 16 | 16 | 16 | 16 |

Image density 1 is low compared with image density 7. Alternatively, the keyboard 18 has a specific key for manually setting the reference gradation level N1 separately from the setting of the image density.

The keyboard 18 has a key for inputting an instruction indicating whether the aforementioned auto exposure function should be set in the shading correction circuit. When the auto exposure function is selected, gradation levels relating to the background of a document are eliminated. For example, the brightest peak of the background corresponds to gradation level 5, the gradation levels equal to or less than 5 are eliminated. A range of the remaining gradation levels from 6 to 63 is divided into 64 rearranged (relative) gradation levels. Gradation level 0 out of the 64 rearranged gradation levels does not correspond to pure white, but a pseudo-white. When a photograph image having less white background is processed, the auto exposure function is advantageous to reproducing high-resolution image. The background correction executed by the background correction circuit 7 is also effective to such rearranged gradation levels. The ON/OFF signal derived from the microcomputer 17 may be controlled in connection with ON/OFF (select/non-select) of the auto exposure function. When the auto exposure function is selected, the ON/OFF signal holds the latch 13 ON. Alternatively, the ON/OFF signal is generated separately from ON/OFF of the auto exposure function. In this case, the keyboard 18 is equipped with a specific key for inputting an instruction that indicates whether the latch 13 (background correction) should be ON or OFF.

Figure 10:
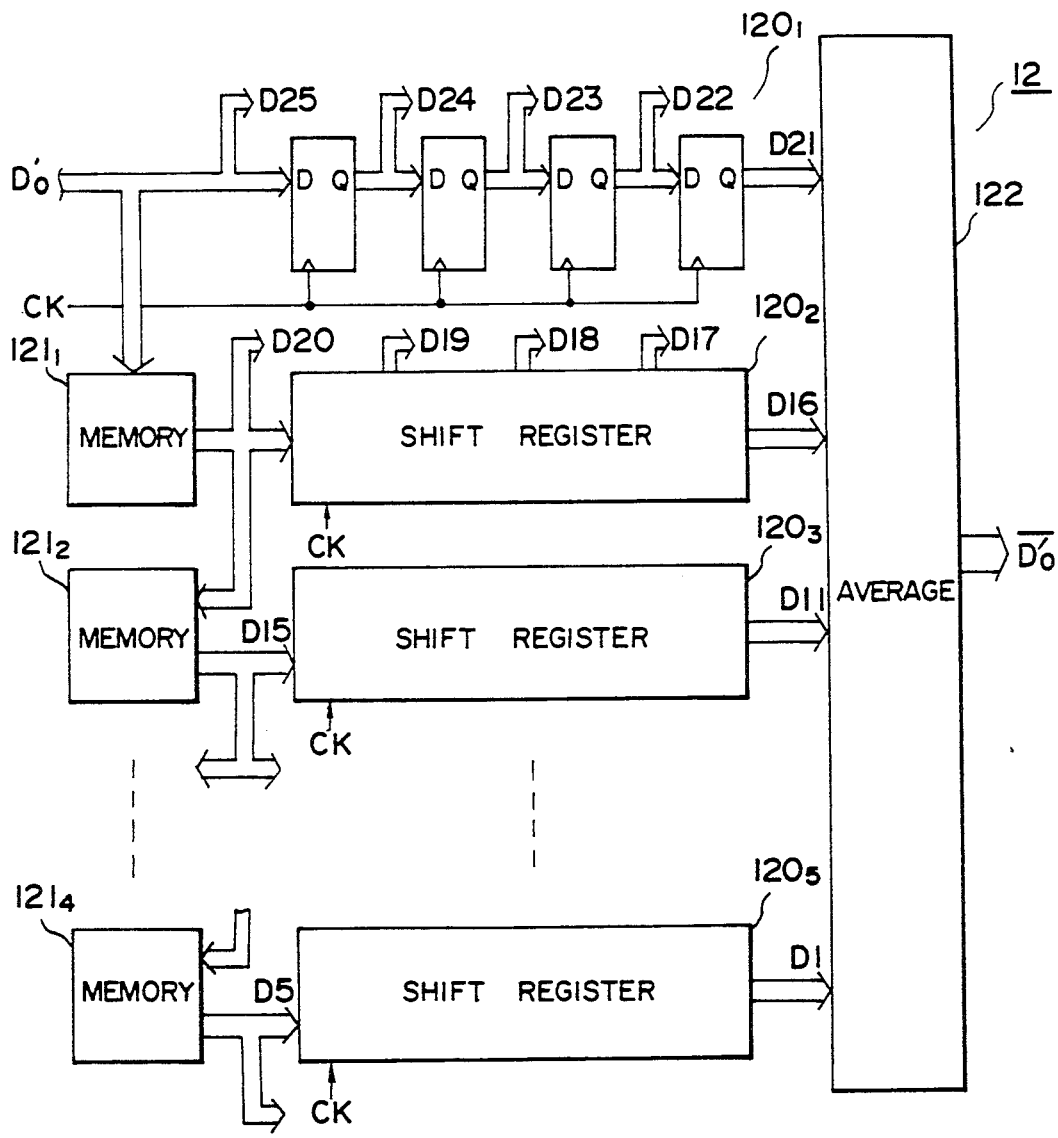
FIG. 10 is a diagram of an averaging circuit shown in FIG. 7.

FIG. 10 is a block diagram of the averaging circuit 12 shown in FIG. 7. The illustrated configuration relates to the 5×5 matrix of pixels. The averaging circuit 12 is made up of five shift registers $120_1-120_5$, four memories $121_1$ to $121_4$, and an average calculator 122. Each of the shift registers $120_1$ to $121_5$ consists of four latches of D-type flip-flops which are connected in series and driven by the clock signal CK. The image signal $D_0'$ is supplied to the latch of the first stage and the memory $121_1$. When 25 pixels of the 5×5 matrix are labeled as shown in FIG. 11, the gradation level data D1–D25 of the pixels are supplied to the average calculator 122 as the same time as the last gradation level data D25 is supplied to the shift register $120_1$.

The present invention is not limited to the aforementioned embodiments and variations and modification may be made without departing from the scope of the present invention.

What is claimed is:

1. An image processing apparatus for processing image data read out from a document comprising:

comparing means for determining whether or not input gradation levels of pixels included in a predetermined matrix are equal to or higher than a reference gradation level, said pixels including a pixel of concern and a predetermined number of peripheral pixels;

converting means for converting the input gradation levels of said pixels equal to or higher than said reference gradation level into a predetermined gradation level less than said reference gradation level and for passing the input gradation levels of said pixels less than said reference gradation level as they are;

averaging means, coupled to said converting means, for averaging said predetermined gradation level of each of said pixels having the input gradation levels equal to or higher than said reference gradation level and said input gradation levels of the remaining pixels to thereby output an averaged gradation level of said pixel of concern; and output means for deriving a background corrected gradation level of said pixel of concern from said input gradation level of said pixel of concern and said averaged gradation level relating thereto.

2. An image processing apparatus as claimed in claim 1, wherein said predetermined gradation level is a gradation level corresponding to pure white.

3. An image processing apparatus as claimed in claim 1, wherein said predetermined gradation level is a gradation level close to a gradation level corresponding to pure white.

4. An image processing apparatus as claimed in claim 1, wherein said averaging means calculates an arithmetical average of said predetermined gradation level of each of said pixels having the input gradation levels equal to or higher than said reference gradation level and said input gradation levels of the remaining pixels less than said reference gradation level.

5. An image processing apparatus as claimed in claim 1, wherein said averaging means calculates a weighted average of said predetermined gradation level of each of said pixels having the input gradation levels equal to or higher than said reference gradation level and said input gradation levels of the remaining pixels less than said reference gradation level.

6. An image processing apparatus as claimed in claim 1, wherein said reference gradation level is based on an image density at which an image formed by said pixels is recorded on a recording media.

7. An image processing apparatus as claimed in claim 6, wherein when said image density is set so as to increase, said reference gradation level is set so as to increase.

8. An image processing apparatus as claimed in claim 1, further comprising input means for manually inputting said reference gradation level to be supplied to said comparing means.

9. An image processing apparatus as claimed in claim 1, further comprising input means for automatically inputting said reference gradation level on the basis of said image density.

10. An image processing apparatus as claimed in claim 1, wherein the number of pixels contained in said matrix is selected on the basis of the size of a background contamination because of the presence of flare occurring when said input gradation levels are obtained by reading said document.

11. An image processing apparatus as claimed in claim 1, wherein the input gradation levels of said pixels are data obtained by a process of converting observed gradation levels of said pixels into relative gradation levels on the basis of a peak gradation level of a background image of said document.

12. An image processing apparatus as claimed in claim 11, wherein said peak gradation level is closet to pure white.

13. An image processing apparatus as claimed in claim 11, wherein said reference gradation level is determined based on said peak gradation level.

14. An image processing apparatus as claimed in claim 1, wherein said predetermined gradation level is the lowest gradation level of a background of said document.

15. An image processing apparatus as claimed in claim 1, wherein said predetermined gradation level is the lowest one of the gradation levels of said pixels contained in said matrix.

16. An image processing method for processing image data read out from a document, comprising the steps of:

determining whether input gradation levels of pixels included in a predetermined matrix are equal to or higher than a reference gradation level, said pixels including a pixel of concern and a predetermined number of peripheral pixels;

converting the input gradation levels of said pixels equal to or higher than said reference gradation level into a predetermined gradation level less than said reference gradation level and for passing the input gradation levels of said pixels less than said reference gradation level as they are;

averaging said predetermined gradation level of each of said pixels having the input gradation levels equal to or higher than said reference gradation level and said input gradation levels of the remaining pixels other than said pixels relating to said reference gradation level to thereby output an averaged gradation level of said pixel of concern; and deriving a background corrected gradation level of said pixel of concern from said predetermined gradation level relating to said pixel of concern and said averaged gradation level relating thereto.

17. An image processing method as claimed in claim 16, wherein said predetermined gradation level is a gradation level corresponding to pure white.

18. An image processing method as claimed in claim 16, wherein said predetermined gradation level is a gradation level close to a gradation level corresponding to pure white.

19. An image processing method as claimed in claim 16, wherein said averaging step comprises a step of calculating an arithmetical average of said predetermined gradation level of each of said pixels having the input gradation levels equal to or higher than said reference gradation level and said input gradation levels of the remaining pixels less than said reference gradation level.

20. An image processing method as claimed in claim 16, wherein said averaging step comprises a step of calculating a weighted average of said predetermined gradation level of each of said pixels having the input gradation levels equal to or higher than said reference gradation level and said input gradation levels of the remaining pixels less than said reference gradation level.

21. An image processing method as claimed in claim 16, wherein said reference gradation level is based on an image density at which an image formed by said pixels is recorded on a recording media.

22. An image processing method as claimed in claim 21, wherein when said image density is set so as to increase, said reference gradation level is set so as to increase.

23. An image processing method as claimed in claim 16, further comprising a step of manually inputting said reference gradation level.

24. An image processing method as claimed in claim 16, further comprising a step of automatically inputting said reference gradation level on the basis of said image density.

25. An image processing method as claimed in claim 16, wherein the number of pixels contained in said matrix is selected on the basis of the size of a background contamination because of the presence of flare occurring when said input gradation levels are obtained by reading said document.

26. An image processing method as claimed in claim 16, wherein the input gradation levels of said pixels are data obtained by a process of converting observed gradation levels of said pixels into relative gradation levels on the basis of a peak gradation level of a background image of said document.

27. An image processing method as claimed in claim 26, wherein said peak gradation level is closet to pure white.

28. An image processing method as claimed in claim 26, wherein said reference gradation level is determined based on said peak gradation level.

29. An image processing method as claimed in claim 16, wherein said predetermined gradation level is the lowest gradation level of a background of said document.

30. An image processing method as claimed in claim 16, wherein said predetermined gradation level is the lowest one of the gradation levels of said pixels contained in said matrix.

* * * * *